(12) United States Patent
Kobayashi et al.

(10) Patent No.: US 12,474,225 B2
(45) Date of Patent: Nov. 18, 2025

(54) STACKED ELECTRODE, ELECTRODE-EQUIPPED STRAIN RESISTANCE FILM, AND PRESSURE SENSOR

(71) Applicant: TDK CORPORATION, Tokyo (JP)

(72) Inventors: Masanori Kobayashi, Tokyo (JP); Ken Unno, Tokyo (JP); Tetsuya Sasahara, Tokyo (JP); Kohei Nawaoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 287 days.

(21) Appl. No.: 18/278,066

(22) PCT Filed: Feb. 25, 2022

(86) PCT No.: PCT/JP2022/008052
§ 371 (c)(1),
(2) Date: Aug. 21, 2023

(87) PCT Pub. No.: WO2022/186088
PCT Pub. Date: Sep. 9, 2022

(65) Prior Publication Data
US 2024/0125659 A1    Apr. 18, 2024

(30) Foreign Application Priority Data
Mar. 3, 2021  (JP) .................. 2021-033652

(51) Int. Cl.
*G01L 1/22* (2006.01)
(52) U.S. Cl.
CPC ................. *G01L 1/2287* (2013.01)

(58) Field of Classification Search
None
See application file for complete search history.

(56) References Cited

U.S. PATENT DOCUMENTS

| 5,973,408 | A | 10/1999 | Nagasaka et al. |
| 9,176,014 | B2 * | 11/2015 | Fuji ...................... G01L 9/0048 |
| 9,200,974 | B2 * | 12/2015 | Matsunami ........... G01L 9/0052 |
| 9,488,541 | B2 * | 11/2016 | Fukuzawa ............. G01L 9/0051 |
| 9,872,624 | B2 * | 1/2018 | Fuji .................... A61B 5/02141 |

(Continued)

FOREIGN PATENT DOCUMENTS

| CN | 117629498 A | * | 3/2024 | ............ G01L 19/06 |
| JP | H10-185725 A | | 7/1998 | |

(Continued)

OTHER PUBLICATIONS

Dec. 6, 2024 Extended European Search Report issued in European Patent Application No. 22763144.7.

*Primary Examiner* — Peter J Macchiarolo
*Assistant Examiner* — Jermaine L Jenkins
(74) *Attorney, Agent, or Firm* — Oliff PLC

(57) ABSTRACT

A stacked electrode is provided on a strain resistance film, wherein: the strain resistance film contains Cr and Al; the stacked electrode has a contact layer that overlaps the strain resistance film, a diffusion prevention layer that overlaps the contact layer, and a mounting layer that overlaps the diffusion prevention layer; and the diffusion prevention layer or the mounting layer covers the contact layer so that an end surface of the contact layer is not exposed.

9 Claims, 13 Drawing Sheets

(56) References Cited

U.S. PATENT DOCUMENTS

| | | | |
|---|---|---|---|
| 2006/0043605 A1* | 3/2006 | Naka | H01L 24/05 257/737 |
| 2015/0001650 A1 | 1/2015 | Matsunami et al. | |
| 2021/0210408 A1 | 7/2021 | Kitazumi et al. | |

FOREIGN PATENT DOCUMENTS

| | | |
|---|---|---|
| JP | 2015-010931 A | 1/2015 |
| JP | 2018-091848 A | 6/2018 |
| WO | 2020/004567 A1 | 1/2020 |

* cited by examiner

STACKED ELECTRODE, ELECTRODE-EQUIPPED STRAIN RESISTANCE FILM, AND PRESSURE SENSOR

TECHNICAL FIELD

The present invention relates to a stacked electrode provided on a strain resistance film, an electrode-equipped strain resistance film, and a pressure sensor including them.

BACKGROUND

In recent years, strain resistance films have attracted attention as sensor materials applicable to pressure sensors for detecting the pressure of liquids, gases, or the like (see Patent Document 1). In a pressure sensor using a strain resistance film, the strain resistance film is formed on the surface of a base substrate also referred to as a membrane, and the deformation of the base substrate generated by application of fluid pressure, etc. generates a strain in the strain resistance film formed on the base substrate and changes its electrical resistance. The pressure applied to the base substrate can be calculated by detecting the change in electrical resistance as an electrical signal based on the detected value.

By the way, to take out the above-described electrical signal to an external circuit, an electrode is formed on the surface of the strain resistance film or the like. For example, Patent Document 1 discloses a technique of forming a stacked electrode composed of Au/Ni/Cr at a predetermined position of a strain resistance film. Here, in the stacked electrode described in Patent Document 1, the layer composed of Cr is also referred to as a contact layer and is formed of a material having excellent adhesion to the strain resistance film. In a high-temperature or high-humidity environment, however, deterioration of the contact layer progresses, and the reliability of the electrode and thus the pressure sensor may decrease.

PRIOR ARTS

Patent Document

Patent Document 1: JP2018091848 (A)

SUMMARY OF INVENTION

Problems to be Solved by Invention

The present invention has been made in view of such problems, and an object thereof is to provide a stacked electrode, an electrode-equipped strain resistance film, and a pressure sensor having excellent heat resistance and moisture resistance.

Means for Solving the Problem

To achieve the above object, a stacked electrode according to the present invention is a stacked electrode provided on a strain resistance film containing Cr and Al, comprising:
a contact layer overlying the strain resistance film;
a diffusion prevention layer overlying the contact layer; and
a mounting layer overlying the diffusion prevention layer,
wherein the diffusion prevention layer or the mounting layer covers the contact layer so that the contact layer is not exposed.

In the stacked electrode according to the present invention, the diffusion prevention layer or the mounting layer covers the contact layer so that the contact layer is not exposed. Thus, the diffusion prevention layer or the mounting layer can isolate the contact layer from the external environment such as air and can prevent the contact layer from being exposed to the external environment. Thus, it is possible to achieve the stacked electrode protecting the contact layer, which is easy to deteriorate, even in a high-temperature or high-humidity environment and having excellent heat resistance and moisture resistance.

Preferably, the mounting layer or the diffusion prevention layer is in contact with an upper surface of the strain resistance film at a position outside an end surface of the contact layer. In this case, the mounting layer or the diffusion prevention layer exceeds the end surface of the contact layer and extends to a position outside the end surface of the contact layer. As a result, the mounting layer or the diffusion prevention layer can cover the entire periphery of the end surface of the contact layer and effectively isolate the end surface of the contact layer from the external environment such as air, and the above-described effects can be obtained favorably.

Preferably, the mounting layer among the diffusion prevention layer and the mounting layer covers the contact layer so that an end surface of the contact layer is not exposed. In general, the mounting layer is often composed of a material that is stable against high temperatures. In this case, the above-described configuration can effectively prevent deterioration of the contact layer, particularly, in a high temperature environment.

Preferably, the diffusion prevention layer covers the contact layer so that an end surface of the contact layer is not exposed, and the mounting layer covers the diffusion prevention layer so that an end surface of the diffusion prevention layer is not exposed. In this configuration, the end surface of the contact layer can be isolated from the external environment by two layers of the diffusion prevention layer and the mounting layer, and the above-described effects can be obtained favorably. Moreover, when the diffusion prevention layer covers the end surface of the contact layer, it is possible to effectively prevent the elements contained in the contact layer or the strain resistance film from mutually diffusing from the end surface of the contact layer to the mounting layer.

Preferably, the mounting layer overlying the diffusion prevention layer or the diffusion prevention layer overlying the contact layer obliquely extends toward an upper surface of the strain resistance film located outside an end surface of the contact layer. In this configuration, it is possible to form the mounting layer or the diffusion prevention layer to a position sufficiently separated from the end surface of the contact layer and to have a sufficient distance between the end surface of the contact layer and the external environment. As a result, the end surface of the contact layer can be effectively isolated from the external environment, and the above-described effects can be obtained favorably.

Preferably, an unevenness is formed on an interface between the mounting layer or the diffusion prevention layer and the strain resistance film. In this configuration, the creepage distance along the interface between the mounting layer or the diffusion prevention layer and the strain resistance film can be extended by the amount of the unevenness, and it is possible to effectively isolate the end surface of the contact layer from the external environment and to favorably obtain the above-described effects. Moreover, the bonding area between the mounting layer or the diffusion prevention layer and the strain resistance film is increased, and the adhesion force (bonding strength) therebetween can be increased.

Preferably, the contact layer contains Ti, the diffusion prevention layer contains a platinum group element, and the mounting layer contains Au. Since Ti easily forms an alloy with other metal elements, the inclusion of Ti in the contact layer can ensure the adhesion strength between films and between layers and effectively prevent delamination defects of the films. Moreover, since Ti has a property of being comparatively difficult to diffuse into the strain resistance film containing Cr and Al, the inclusion of Ti in the contact layer can effectively prevent mutual diffusion to the strain resistance film. Moreover, since Ti has a property of being also difficult to diffuse into the mounting layer containing Au, the inclusion of Ti in the contact layer is less likely to generate precipitation onto the upper surface of the mounting layer.

Moreover, since platinum group elements are chemically stable elements, the inclusion of a platinum group element in the diffusion prevention layer can effectively prevent the elements contained in the contact layer or the diffusion prevention layer from mutually diffusing into the mounting layer. Moreover, it is possible to effectively restrain the reaction of mutually diffused elements at the interface of the mounting layer.

Moreover, the mounting layer is connected to an external circuit via a wiring, and an Au wiring excellent in heat resistance is preferably used as the wiring. In this case, the adhesion of the wiring to the mounting layer is improved by containing Au in the mounting layer.

To achieve the above object, an electrode-equipped strain resistance film according to the present invention comprises: any of the above-described stacked electrodes; and the strain resistance film provided with the stacked electrode. An electrode-equipped strain resistance film having excellent heat resistance and moisture resistance can be achieved by providing the strain resistance film with the stacked electrode having excellent heat resistance and moisture resistance as described above.

To achieve the above object, a pressure sensor according to the present invention comprises: any of the above-described stacked electrodes; the strain resistance film provided with the stacked electrode; and a membrane provided with the strain resistance film. A pressure sensor having excellent heat resistance and moisture resistance can be achieved by providing the strain resistance film with the stacked electrode having excellent heat resistance and moisture resistance as described above and further providing the membrane with the strain resistance film.

DETAILED DESCRIPTION OF INVENTION

Hereinafter, the present invention is described based on embodiments shown in the figures.

First Embodiment

Figure 1:
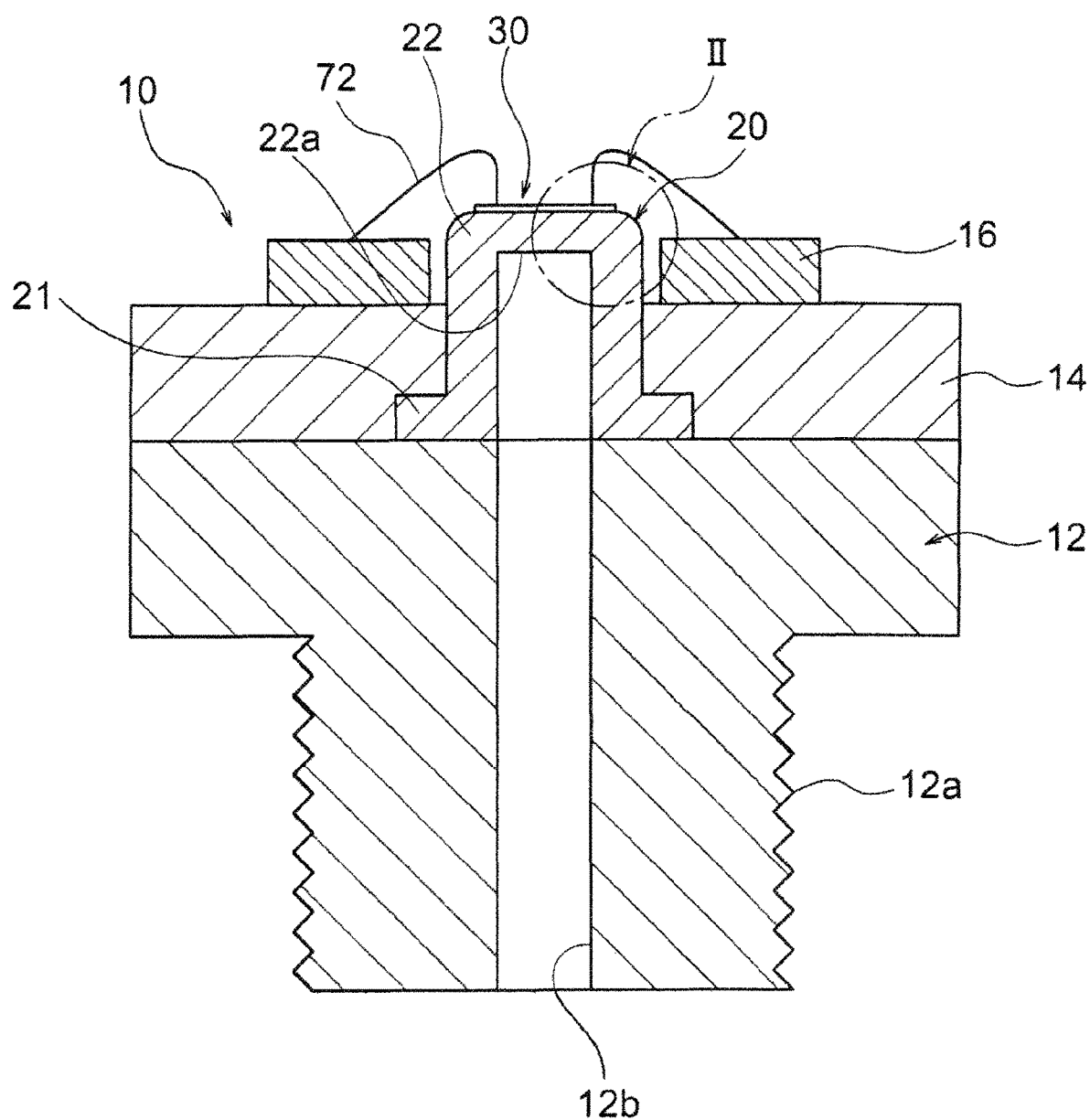
FIG. 1 is a schematic cross-sectional view of a pressure sensor according to First Embodiment of the present invention.

As shown in FIG. 1, a pressure sensor 10 includes a stacked electrode 36 (see FIG. 2), an electrode-equipped strain resistance film 30 on which the stacked electrode 36 is disposed according to First Embodiment of the present invention, and a membrane 22 on which the electrode-equipped strain resistance film 30 is disposed. The pressure sensor 10 is used in a high-temperature and high-pressure environment. Hereinafter, the direction along the surface of the electrode-equipped strain resistance film 30 is referred to as the in-plane direction, and the thickness direction of the electrode-equipped strain resistance film 30 is referred to as the perpendicular-plane direction.

The pressure sensor 10 further includes a stem 20, a connection member 12, a holding member 14, and a circuit board 16. The stem 20 is made of a metal, such as stainless steel, and has a hollow cylindrical shape. One end of the stem 20 is a closed end closed by an end wall, and the other end of the stem 20 is an open end. The membrane 22 is made of an end wall forming one end of the stem 20 and is configured to be deformable according to pressure.

The stem 20 is disposed on the upper surface of the connection member 12. A hollow portion formed inside the stem 20 communicates with a flow path 12b of the connection portion 12 at the other end of the stem 20. In the pressure sensor 10, the fluid introduced into the flow path 12b is guided from the hollow portion of the stem 20 to an inner surface 22a of the membrane 22, and fluid pressure is applied to the membrane 22. When the membrane 22 is applied with fluid pressure and has deformation, strain is generated in the strain resistance film 30 formed on the surface of the membrane 22, and its electrical resistance changes. The pressure sensor 10 detects the change in electrical resistance as an electrical signal and can thereby measure the pressure applied to the membrane 22 based on the detected value.

The stem 20 includes a flange portion 21. The flange portion 21 is formed around the open end of the stem 20 and protrudes outward from the core axis of the stem 20. The flange portion 21 is sandwiched between the connection member 12 and the holding member 14, and the flow path 12b leading to the inner surface 22a of the membrane 22 is sealed.

The connection member 12 includes a screw groove 12a. The pressure sensor 10 is fixed via the screw groove 12a to a pressure chamber or the like in which a fluid to be measured is enclosed. As a result, the flow path 12b formed inside the connection member 12 and the inner surface 22a of the membrane 22 in the stem 20 can be airtightly communicated with the pressure chamber in which a fluid to be measured exists.

The circuit board 16 is attached to the upper surface of the holding member 14. The circuit board 16 has a ring shape surrounding the stem 20, but the shape of the circuit board 16 is not limited to this. The circuit board 16 incorporates, for example, a circuit to which a detection signal from the electrode-equipped strain resistance film 30 is transmitted.

The electrode-equipped strain resistance film 30 is disposed on the outer surface 22b of the membrane 22. The electrode-equipped strain resistance film 30 and the circuit board 16 are connected with an intermediate wiring 72 by wire bonding or the like.

Figure 2:
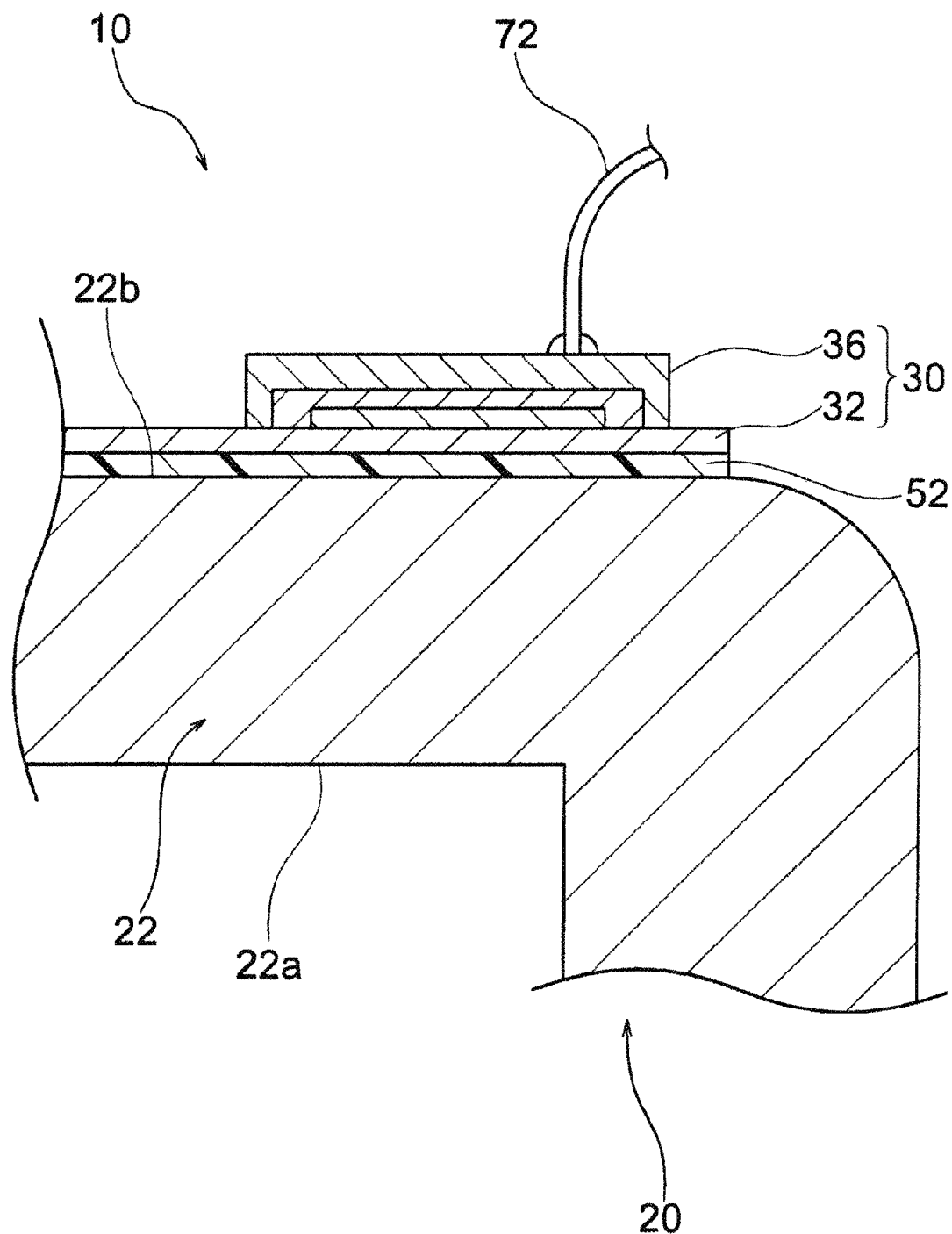
FIG. 2 is an enlarged cross-sectional view of the portion indicated by II in FIG. 1.

As shown in FIG. 2, the electrode-equipped strain resistance film 30 includes a strain resistance film 32 and the strain-resistance-film stacked electrode (hereinafter, stacked electrode) 36. The strain resistance film 32 is disposed on the outer surface 22b of the membrane 22 via a base insulating layer 52. The base insulating layer 52 is formed so as to cover substantially the entire outer surface 22b of the membrane 22 and is made of, for example, silicon oxide, silicon nitride, or silicon oxynitride. The thickness of the base insulating layer 52 is preferably 10 µm or less, more preferably 1 to 5 µm. The base insulating layer 52 can be formed on the outer surface 22b of the membrane 22 by vapor deposition, such as CVD.

Note that, when the outer surface 22b of the membrane 22 has insulating properties, the strain resistance film 32 may be formed directly on the outer surface 22b of the membrane 22 without forming the base insulating layer 52. For example, when the membrane 22 is made of an insulating material such as alumina, the strain resistance film 32 may be provided directly on the outer surface 22b of the membrane 22.

Figure 3:
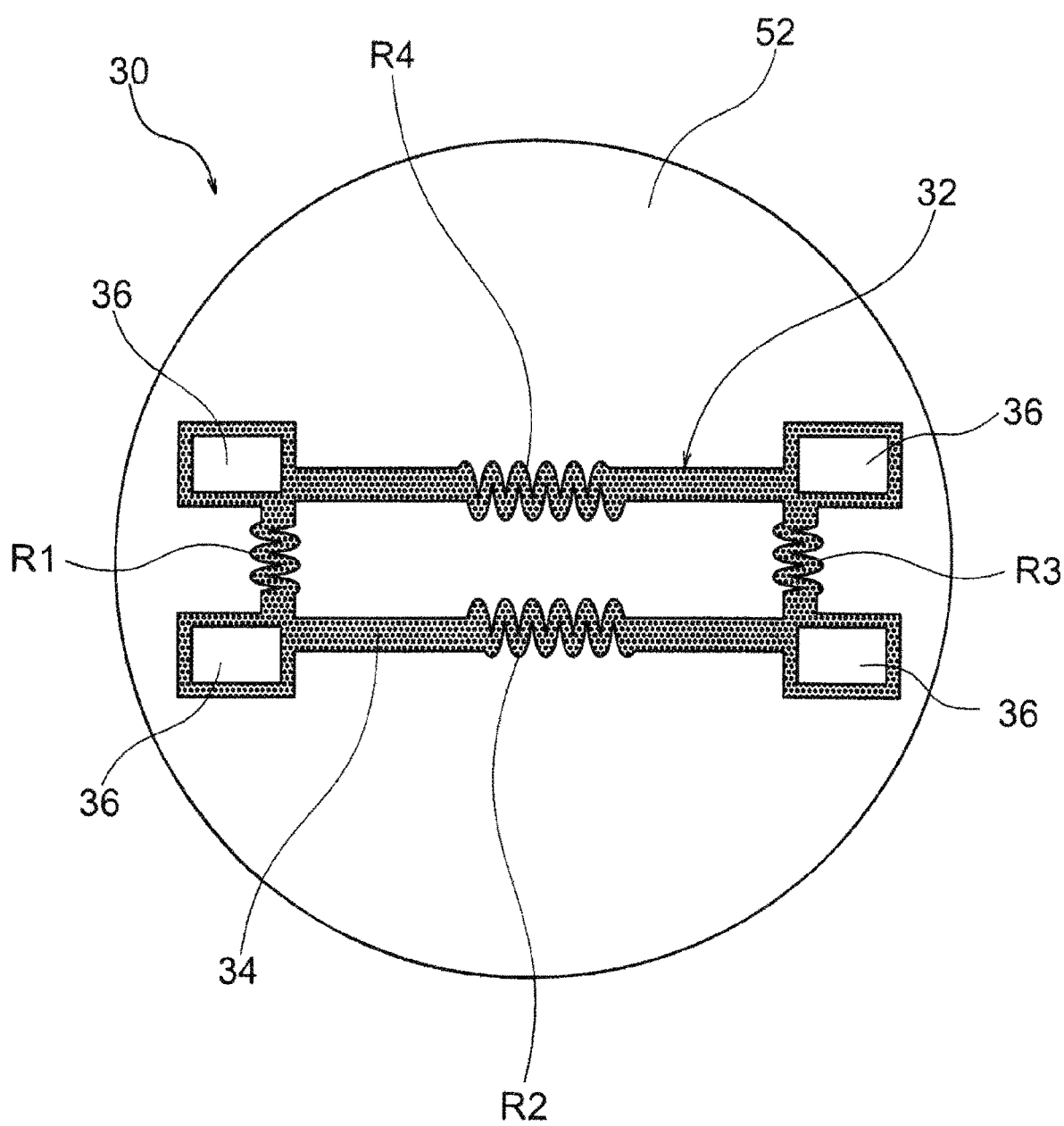
FIG. 3 is a schematic view illustrating an example of pattern arrangement of an electrode-equipped strain resistance film included in the pressure sensor shown in FIG. 1.

As shown in FIG. 3, the strain resistance film 32 includes a first resistor R1, a second resistor R2, a third resistor R3, and a fourth resistor R4 formed in a predetermined pattern. The first resistor R1 to the fourth resistor R4 generate strain according to the deformation of the membrane 22, and the resistance values of the first resistor R1 to the fourth resistor R4 change according to the deformation of the membrane 22. The first to fourth resistors R1 to R4 are connected by an electrical wiring 34 so as to form a Wheatstone bridge circuit.

The pressure sensor 10 detects a fluid pressure acting on the membrane 22 based on the output of the Wheatstone bridge circuit formed by the first resistor R1 to the fourth resistor R4. The first resistor R1 to the fourth resistor R4 are arranged at positions where the membrane 22 shown in FIG. 1 and FIG. 2 is deformed and distorted by fluid pressure, and the resistance values change according to the amount of strain.

The strain resistance film 32 including the first resistor R1 to the fourth resistor R4 can be manufactured by, for example, patterning a conductive thin film of a predetermined material. The strain resistance film 32 contains Cr and Al and preferably contains 50 to 99 at % of Cr and 1 to 50 at % of Al, more preferably 70 to 90 at % of Cr and 5 to 30 at % of Al. Since the strain resistance film 32 contains Cr and Al, temperature coefficient of resistance (TCR) and temperature coefficient of sensitivity (TCS) in a high temperature environment are stabilized, and a pressure detection with high accuracy becomes possible. Moreover, when each amount of Cr and Al is within a predetermined range, both a high gauge factor and a favorable temperature stability can be achieved at a higher level.

The strain resistance film 32 may contain elements other than Cr and Al. For example, the strain resistance film 32 may contain O and N. O and N contained in the strain resistance film 32 may be those not completely removed from a reaction chamber and remained in the formation of the strain resistance film 32 and taken into the strain resistance film 32. Also, O and N contained in the strain resistance film 32 may be those intentionally introduced into the strain resistance film 32 by being used as an atmosphere gas during film formation or annealing.

Also, the strain resistance film 32 may contain metal elements other than Cr and Al. The strain resistance film 32 may be improved in gauge factor and temperature characteristics by containing trace amounts of metal and non-metal elements other than Cr and Al and performing a heat treatment such as annealing. Examples of metal and non-metal elements other than Cr and Al contained in the strain resistance film 32 include Ti, Nb, Ta, Ni, Zr, Hf, Si, Ge, C, P, Se, Te, Zn, Cu, Bi, Fe, Mo, W, As, Sn, Sb, Pb, B, Ge, In, Tl, Ru, Rh, Re, Os, Ir, Pt, Pd, Ag, Au, Co, Be, Mg, Ca, Sr, Ba, Mn, and rare earth elements.

The strain resistance film 32 can be formed by a thin film method such as sputtering and vapor deposition. The first resistor R1 to the fourth resistor R4 can be formed by, for example, patterning a thin film into a meandering shape. The thickness of the strain resistance film 32 is not limited, but is preferably 10 µm or less, more preferably 0.1 to 1 µm. Note that, the electric wiring 34 may be formed by patterning the strain resistance film 32 as shown in FIG. 3 or may be formed by a conductive film or layer different from the strain resistance film 32.

As shown in FIG. 2, the stacked electrode 36 is disposed so as to overlie the strain resistance film 32. For more detail, the stacked electrode 36 is formed on a part of the upper surface of the strain resistance film 32.

As shown in FIG. 3, the stacked electrode 36 is formed independently at each of four locations on the strain resistance film 32. In the illustrated example, the four stacked electrodes 36 are arranged at positions corresponding to four vertices of a virtual rectangle. Also, the first resistor R1 to the fourth resistor R4 are arranged at positions corresponding to four sides of the virtual rectangle. Each of the stacked electrodes 36 is electrically connected to any two of the first resistor R1 to the fourth resistor R4 via the electric wiring 34.

For more detail, the first resistor R1 and the second resistor R2 are electrically connected via a first stacked electrode 36. The second resistor R2 and the third resistor R3 are electrically connected via a second stacked electrode 36. The third resistor R3 and the fourth resistor R4 are electrically connected via a third stacked electrode 36. The fourth resistor R4 and the first resistor R1 are electrically connected via a fourth stacked electrode 36.

Although detailed illustration is omitted, one end of the intermediate wiring 72 shown in FIG. 1 and FIG. 2 is connected to each of the stacked electrodes 36 shown in FIG. 3. That is, the output of the Wheatstone bridge circuit by the first resistor R1 to the fourth resistor R4 is transmitted to the circuit board 16 shown in FIG. 1 via the stacked electrodes 36 and the intermediate wiring 72 (see FIG. 1 and FIG. 2).

Figure 4A:
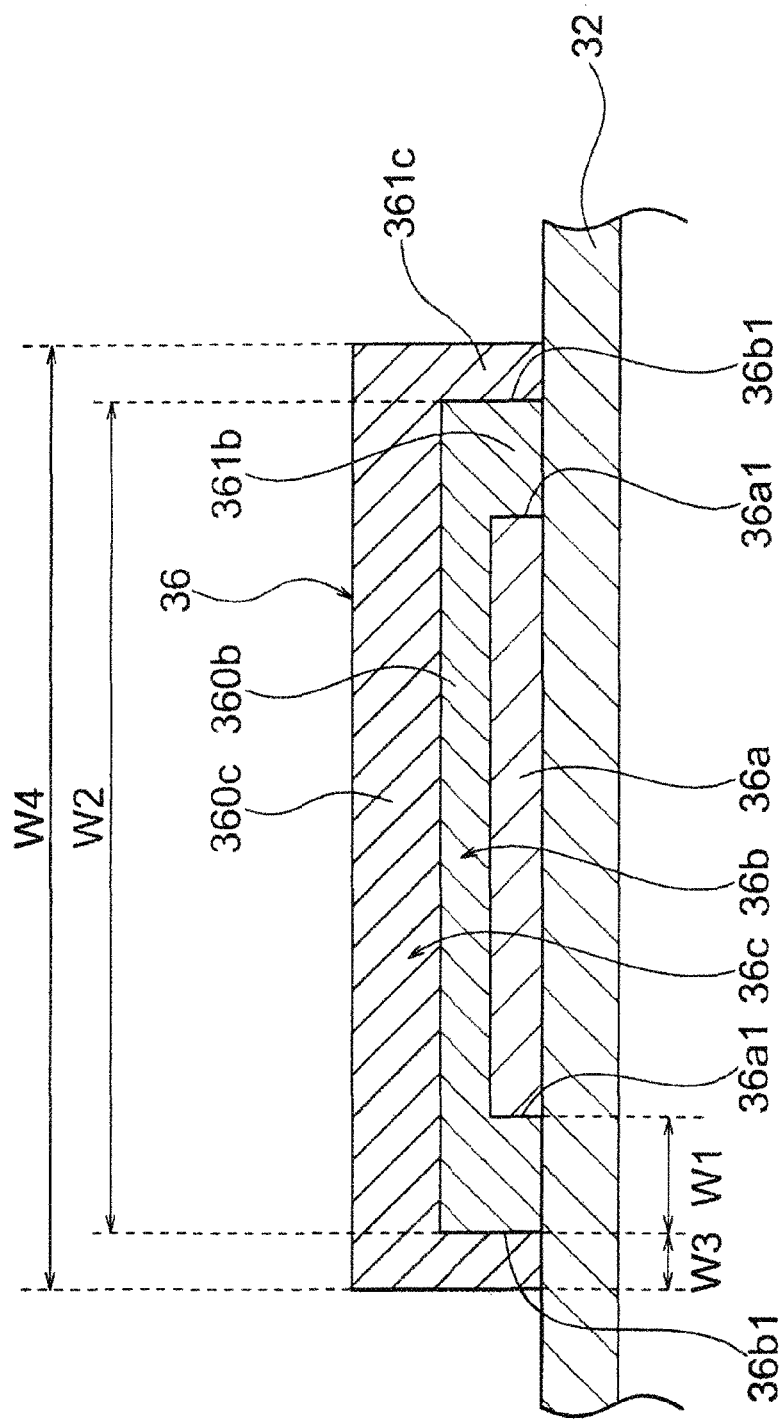
FIG. 4A is an enlarged cross-sectional view of a stacked electrode included in the pressure sensor shown in FIG. 2.

As shown in FIG. 4A, the stacked electrode 36 includes a contact layer 36a overlying the strain resistance film 32, a diffusion prevention layer 36b overlying the contact layer 36a, and a mounting layer 36c overlying the diffusion prevention layer 36b. The stacked electrode 36 has a multilayer structure of three or more layers made of different materials. However, the stacked electrode 36 is not limited to having the three-layer structure as shown in FIG. 4A and may have a multilayer structure of four or more layers.

The contact layer 36a is located as the lowest layer in the stacked electrode 36 and is directly in contact with the strain resistance film 32. The contact layer 36a ensures an ohmic contact with the strain resistance film 32 and improves the electrical characteristics of the electrode-equipped strain resistance film 30. The contact layer 36a ensures the adhesion strength between the strain resistance film 32 and the stacked electrode 36 and prevents delamination defects of the films and layers.

The contact layer 36a can be formed by a thin film method such as sputtering and vapor deposition. The thickness of the contact layer 36a is not limited and is, for example, 1 to 50 nm, preferably 5 to 20 nm. Preferably, the contact layer 36a contains at least one of Cr, Ti, Ni, and Mo. Since these elements easily form alloys with other metals, the contact layer 36a containing such elements ensures the adhesion strength with the strain resistance film 32 and the diffusion prevention layer 36b and can prevent delamination defects between the films and the layers.

Particularly preferably, the contact layer 36a contains Ti. Ti tends to be difficult to diffuse into the mounting layer 36c containing Au or the like and to be less likely to precipitate onto the upper surface of the mounting layer 36c. Thus, the stacked electrode 36 including the contact layer 36a containing Ti exhibits a favorable adhesion to the intermediate wiring 72 even after the stacked electrode 36 is exposed to a high temperature environment.

Moreover, since Ti is also difficult to diffuse into Cr, Ti constituting the contact layer 36a has a property of being difficult to diffuse into the strain resistance film 32 containing Cr and Al even in a high temperature environment. Thus, even when used in a high temperature environment, the electrode-equipped strain resistance film 30 including the contact layer 36a containing Ti can prevent the diffusion of elements in the stacked electrode 36 into the strain resistance film 32 and can prevent performance degradation of the strain resistance film 32 due to composition change.

Also, preferably, the contact layer 36a contains a plurality of elements from Cr, Ti, Ni, and Mo. Also, preferably, the contact layer 36a is composed of at least one of Cr, Ti, Ni, and Mo. Moreover, particularly preferably, the contact layer 36a is composed of Ti. Also, preferably, the contact layer 36a is composed of a plurality of elements from Cr, Ti, Ni, and Mo.

Note that, when the contact layer 36a, the diffusion prevention layer 36b, and the mounting layer 36c are composed of one or more specified elements, it is not excluded that other elements excluding the specified elements are unavoidably or intentionally contained in these layers. In that case, the content rate of other elements is, for example, less than 10 at %, preferably less than 3 at %, more preferably less than 1 at %.

The diffusion prevention layer 36b is disposed between the contact layer 36a and the mounting layer 36c in the stacked electrode 36 and is vertically sandwiched between the mounting layer 36c and the contact layer 36a. The diffusion prevention layer 36b prevents elements contained in the films and layers arranged below the diffusion prevention layer 36b, such as the strain resistance film 32 and the contact layer 36a, from diffusing into the mounting layer 36c disposed above the diffusion prevention layer 36b and from precipitating into the upper surface of the mounting layer 36c. Note that, preferably, even when the strain resistance film 32 and the stacked electrode 36 have a multilayer structure of four or more layers, the diffusion prevention layer 36b is disposed directly below the mounting layer 36c.

The diffusion prevention layer 36b can be formed by a thin film method such as sputtering and vapor deposition. The thickness of the diffusion prevention layer 36b is not limited and is, for example, 1 to 500 nm, preferably 5 to 50 nm. If the thickness of the diffusion prevention layer 36b is too small, it may be difficult to form a continuous film, and the diffusion prevention function may be weakened. If the thickness of the diffusion prevention layer 36b is too large, there may be problems of film peeling, decrease in productivity (throughput) due to an increase in film formation time.

Preferably, from the viewpoint of preventing the elements contained in the strain resistance film 32, the contact layer 36a, and the like from diffusing to their upper layers, the diffusion prevention layer 36b contains one or more transition elements belonging to the 5th or 6th period. Specifically, preferably, the diffusion prevention layer 36b contains one or more elements selected from Y, Zr, Nb, Mo, Tc, Ru, Rh, Pd, Ag, La, Ce, Pr, Nd, Pm, Sm, Eu, Gd, Tb, Dy, Ho, Er, Tm, Yb, Lu, Hf, Ta, W, Re, Os, Ir, Pt, and Au.

More preferably, the diffusion prevention layer 36b contains one or more platinum group elements. Specifically, preferably, the diffusion prevention layer 36b contains one or more elements selected from Ru, Rh, Pd, Os, Ir, and Pt. Since platinum group elements have a low reactivity and are chemically stable, the diffusion prevention layer 36b containing one or more platinum group elements exhibits a particularly favorable diffusion prevention effect even in a high temperature environment. Note that, among the platinum group elements, Pt particularly has a track record of being used even in other electrode fields and has more technological accumulation than other platinum group elements.

Also, preferably, the diffusion prevention layer 36b is made of one or more transition elements belonging to the 5th or 6th period. Also, preferably, the diffusion prevention layer 36b is made of one or more platinum group elements.

The mounting layer 36c is located as the uppermost layer in the stacked electrode 36 and is exposed on the upper surface of the electrode-equipped strain resistance film 30. The intermediate wiring 72 made of a fine wire of Au, Al, etc. is bonded to the mounting layer 36c by wire bonding or the like. Note that, the pressure sensor 10 using the intermediate wiring 72 made of a fine wire of Au, Al, etc. can be used even in a high temperature environment equal to or more than the melting point of solder and has a favorable heat resistance. Moreover, the pressure sensor 10 using the intermediate wiring 72 made of a fine wire of Au can improve the heat resistance more than a pressure sensor using the intermediate wiring 72 made of a fine wire of Al.

The mounting layer 36c can be formed by a thin film method such as sputtering and vapor deposition. The thickness of the mounting layer 36c is not limited and is, for example, 10 to 400 nm, preferably 100 to 300 nm. If the thickness of the mounting layer 36c is too small, it is difficult to form a continuous film, and the adhesion with the intermediate wiring 72 may deteriorate. If the thickness of the mounting layer 36c is too large, there may be problems of film peeling, decrease in productivity (throughput) due to an increase in film formation time.

Preferably, from the viewpoint of heat resistance and bondability with the intermediate wiring 72, the mounting layer 36c contains at least any of Au, Al, and Ni. More preferably, from the viewpoint of improving heat resistance and further improving compatibility with a high temperature environment, the mounting layer 36c contains Au, which has a low resistance and a high melting point even in a high temperature environment. When a fine wire of Au is used as the material of the intermediate wiring 72, since the mounting layer 36c contains Au, the material of the intermediate wiring 72 and the material of the mounting layer 36c are both Au. This improves the adhesion of the joint portion between the intermediate wiring 72 and the mounting layer 36c.

The mounting layer 36c is preferably composed of at least any of Au, Al, and Ni and is particularly preferably composed of Au.

Hereinafter, the detailed structures of the diffusion prevention layer 36b and the mounting layer 36c are described. The diffusion prevention layer 36b includes a first stacked portion 360b and a first peripheral portion 361b. The first stacked portion 360b is a portion stacked on the upper surface of the contact layer 36a and located inside end surfaces (edge surfaces) 36a1 of the contact layer 36a in the in-plane direction. The first peripheral portion 361b is a portion located outside (lateral) the end surfaces 36a1 of the contact layer 36a in the in-plane direction and is continuously connected to the lateral of the first stacked portion 360b. A width W1 of the first peripheral portion 361b along the in-plane direction is not limited, but is preferably 0.1 to 10 μm. A ratio W1/W2 of a width W1 of the first peripheral portion 361b along the in-plane direction to a width W2 of the diffusion prevention layer 36b (the first stacked portion 360b and the first peripheral portion 361b) along the in-plane direction is preferably $10^{-5}$ to 1, more preferably $10^{-4}$ to $10^{-2}$.

The bottom surface of the first peripheral portion 361b is in contact with the upper surface of the strain resistance film 32. That is, the diffusion prevention layer 36b is in contact with the upper surface of the strain resistance film 32 at positions outside the end surfaces 36a1 of the contact layer 36a in the in-plane direction. The upper surface of the first peripheral portion 361b is substantially flush with the upper surface of the first stacked portion 360b and substantially parallel to the upper surface of the strain resistance film 32. The thickness of the first peripheral portion 361b is larger than the thickness of the first stacked portion 360b and is substantially equal to the sum of the thickness of the contact layer 36a and the thickness of the first stacked portion 360b.

The first peripheral portion 361b is in contact with (closely contacted with) the end surfaces 36a1 of the contact layer 36a in the in-plane direction, and the end surfaces 36a1 of the contact layer 36a are covered in all directions with the inner lateral surfaces of the first peripheral portion 361b without being exposed to the external environment such as air. That is, in the present embodiment, the diffusion prevention layer 36b covers the contact layer 36a so that the end surfaces 36a1 of the contact layer 36a are not exposed. As a result, in the present embodiment, the entire contact layer 36a including its upper surface and the end surfaces 36a1 is covered with the diffusion prevention layer 36b so as not to be exposed.

The mounting layer 36c includes a second stacked portion 360c and a second peripheral portion 361c. The second stacked portion 360c is a portion stacked on the upper surface of the diffusion prevention layer 36b (the first stacked portion 360b and the first peripheral portion 361b) and is located inside end surfaces 36b1 of the diffusion prevention layer 36b. The second peripheral portion 361c is located outside (lateral) the end surfaces 36b1 of the diffusion prevention layer 36b in the in-plane direction and is continuously connected to the lateral of the second stacked portion 360c. A width W3 of the second peripheral portion 361c along the in-plane direction is not limited, but is preferably 0.1 to 10 μm. In the illustrated example, the width W3 of the second peripheral portion 361c along the in-plane direction is smaller than the width W1 of the first peripheral portion 361b along the in-plane direction.

A ratio W3/W4 of a width W3 of the second peripheral portion 361c along the in-plane direction to a width W4 of the mounting layer 36c (the second stacked portion 360c and the second peripheral portion 361c) along the in-plane direction is preferably $10^{-5}$ to 1, more preferably $10^{-4}$ to $10^{-2}$. A ratio W3/W1 of a width W3 of the second peripheral portion 361c along the in-plane direction to a width W1 of the first peripheral portion 361b along the in-plane direction is preferably 1 to 80, more preferably 5 to 17.

The bottom surface of the second peripheral portion 361c is in contact with the upper surface of the strain resistance film 32 on the lateral side of the bottom surface of the first peripheral portion 361b of the diffusion prevention layer 36b. That is, the mounting layer 36c is in contact with the upper surface of the strain resistance film 32 at positions outside the end surfaces 36b1 of the diffusion prevention layer 36b in the in-plane direction. The upper surface of the second peripheral portion 361c is substantially flush with the upper surface of the second stacked portion 360c and substantially parallel to the upper surface of the strain resistance film 32. The thickness of the second peripheral portion 361c is larger than the thickness of the second stacked portion 360c and the thickness of the first peripheral portion 361b of the diffusion prevention layer 36b and is substantially equal to the sum of the thickness of the first peripheral portion 361b and the thickness of the second stacked portion 360c of the mounting layer 36c.

The second peripheral portion 361c is in contact with (closely contacted with) the end surfaces 36b1 of the diffusion prevention layer 36b in the in-plane direction, and the end surfaces 36b1 of the diffusion prevention layer 36b are covered in all directions with the inner side surfaces of the second peripheral portion 361c without being exposed to the external environment such as air. That is, in the present embodiment, the mounting layer 36c covers the diffusion prevention layer 36b so that the end surfaces 36b1 of the diffusion prevention layer 36b are not exposed. As a result, in the present embodiment, the entire diffusion prevention layer 36b including its upper surface and the end surfaces 36b1 is covered with the mounting layer 36c so as not to be exposed, and the entire contact layer 36a including its upper surface and the end surfaces 36a1 is covered with two layers of the diffusion prevention layer 36b and the mounting layer 36c so as not to be exposed.

In the peripheral portion of the stacked electrode 36, the contact layer 36a, the first peripheral portion 361b of the diffusion prevention layer 36b, and the second peripheral portion 361c of the mounting layer 36c are arranged in this order along the upper surface of the strain resistance film 32 in the in-plane direction, and three layers are arranged. In the lateral of the end surfaces 36a1 of the contact layer 36a, the second peripheral portion 361b of the diffusion prevention layer 36b and the second peripheral portion 361c of the mounting layer 36c are arranged in this order in the perpendicular-plane direction, and two layers are arranged.

The diffusion prevention layer 36b exceeds the end surfaces 36a1 of the contact layer 36a and extends to positions outside the end surfaces 36a1 of the contact layer 36 in the in-plane direction. Also, the mounting layer 36c exceeds the end surfaces 36a1 of the contact layer 36a and the end surfaces 36b1 of the diffusion prevention layer 36b and extends to positions outside the end surfaces 36b1 of the diffusion prevention layer 36b in the in-plane direction. Thus, the mounting layer 36c and the diffusion prevention layer 36b can cover the entire peripheries of the end surfaces 36a1 of the contact layer 36a and isolate the end surfaces 36a1 of the contact layer 36a from the external environment such as air.

Next, a method of manufacturing a pressure sensor 10 shown in FIG. 1 is described. To manufacture the pressure sensor 10, firstly, a stem 20 is prepared. The material of the stem 20 is, for example, SUS316. Next, as shown in FIG. 2, an electrode-equipped strain resistance film 30 is formed on an outer surface 22b of a membrane 22 of the stem 20.

To form the electrode-equipped strain resistance film 30, firstly, a base insulating layer 52 is formed with a predetermined thickness by a thin film method such as CVD and sputtering on the outer surface 22b of the membrane 22 so as to cover the membrane 22. A silicon oxide film, a silicon nitride film, or the like is exemplified as a base insulating layer 52.

Next, a strain resistance film 32 is formed on the surface of the base insulating layer 52. The strain resistance film 32 is formed by a thin film method such as vapor deposition and sputtering. The shape of the strain resistance film 32 including a first resistor R1 to a fourth resistor R4, an electrical wiring 34, and the like is formed by patterning by photolithography or the like.

Next, a stacked electrode 36 is formed on the strain resistance film 32. When the stacked electrode 36 is formed, conductive thin films are formed on the strain resistance film 32 in the order of a contact layer 36a, a diffusion prevention layer 36b, and a mounting layer 36c. The contact layer 36a, the diffusion prevention layer 36b, and the mounting layer 36c of the stacked electrode 36 are formed by a thin film method such as sputtering and vapor deposition.

As shown in FIG. 4A, when the diffusion prevention layer 36b is formed, not only the upper surface of the contact layer 36a, but also the portions of the contact layer 36a lateral to the end surfaces 36a1 are covered in all directions so that the end surfaces 36a1 of the contact layer 36a are not exposed. Also, when the mounting layer 36c is formed, not only the upper surface of the diffusion prevention layer 36b, but also the portions of the diffusion prevention layer 36b lateral to the end surfaces 36b1 are covered in all directions so that the end surfaces 36b1 of the diffusion prevention layer 36b are not exposed.

As shown in FIG. 3, the contact layer 36a, the diffusion prevention layer 36b, and the mounting layer 36c are formed only at predetermined positions on the strain resistance film 32. Each of the layers included in the stacked electrode 36 can be patterned by photolithography (lift-off) or the like in the same manner as the strain resistance film 32, but other methods may be employed.

Since the strain resistance film 32 and the stacked electrode 36 are formed as thin films on the base insulating layer 52 formed on the outer surface 22b of the membrane 22, the electrode-equipped strain resistance film 30 shown in FIG. 3 is formed. In the manufacture of the electrode-equipped strain resistance film 30, a heat treatment (e.g., 350 to 800° C.), such as annealing, may be performed after forming the strain resistance film 32 and the stacked electrode 36.

When a heat treatment is performed at an appropriate temperature after forming the strain resistance film 32 and the stacked electrode 36, the characteristics of the strain resistance film 32, such as gauge factor, can be enhanced. Moreover, when a heat treatment is performed after forming the stacked electrode 36, it is possible to improve the bondability between the strain resistance film 32 and the stacked electrode 36 and between the strain resistance film 32 and the respective layers inside the stacked electrode 36.

Note that, the electric wiring 34 may be formed on the strain resistance film 32 at the same time as the formation of the stacked electrode 36 or a part of the layers included in the stacked electrode 36 using the same material as the stacked electrode 36 or a part thereof. In this case, the electrical wiring 34 may be formed on the base insulating layer 52. When the material of the electrical wiring 34 is the same as that of the stacked electrode 36 or a part thereof, it is possible to prevent the problem that the resistance value of the electric wiring 34 is affected by strain, compared to the case where a part of the strain resistance film 32 constitutes the electric wiring 34 (see FIG. 3). Moreover, the electrical wiring 34 having the same material and structure as the stacked electrode 36 has a favorable bondability with the strain resistance film 32 and can prevent delamination defects and the like.

Finally, as shown in FIG. 1, the pressure sensor 10 is obtained by fixing the circuit board 16 to the stem 20 on which the electrode-equipped strain resistance film 30 is formed and forming the intermediate wiring 72 connecting the circuit board 16 and the electrode-equipped strain resistance film 30. The intermediate wiring 72 is formed by wire bonding or the like using a thin wire of Au.

Hereinabove, in the present embodiment, as shown in FIG. 4A, the diffusion prevention layer 36b and the mounting layer 36c cover the contact layer 36a so that the contact layer 36a is not exposed. In particular, in the present embodiment, the first peripheral portion 361b of the diffusion prevention layer 36b and the second peripheral portion 361c of the mounting layer 36c cover the contact layer 36a so that the end surface 36a1 of the contact layer 36a is not exposed. Thus, the first peripheral portion 361b and the second peripheral portion 361c can isolate the end surface 36a1 of the contact layer 36a from the external environment such as air and can prevent the end surface 36a1 of the contact layer 36a from being exposed to the external environment. Thus, it is possible to achieve the stacked electrode 36, the electrode-equipped strain resistance film 30, and the pressure sensor 10 protecting the contact layer 36a, which is easy to deteriorate, even in a high-temperature or high-humidity environment and having excellent heat resistance and moisture resistance.

In particular, in the present embodiment, since the end surface 36a1 of the contact layer 36a can be isolated from the external environment by two layers of the first peripheral portion 361b of the diffusion prevention layer 36b and the second peripheral portion 361c of the mounting layer 36c, and the above-described effects can be obtained favorably.

Moreover, in the present embodiment, it is possible to achieve the pressure sensor 10 capable of sufficiently securing the adhesion between the contact layer 36a and the strain resistance film 32 and the ohmic connection between the contact layer 36a and the strain resistance film 32, preventing the stacked electrode 36 from peeling off from the strain resistance film 32, and having favorable electrical characteristics even in a high-temperature or high-humidity environment.

Moreover, the diffusion prevention layer 36b covering the end surfaces 36a1 of the contact layer 36a can effectively prevent the elements contained in the contact layer 36a or the strain resistance film 32 from mutually diffusing from the end surfaces 36a1 of the contact layer 36a to the mounting layer 36c.

Second Embodiment

Figure 5A:
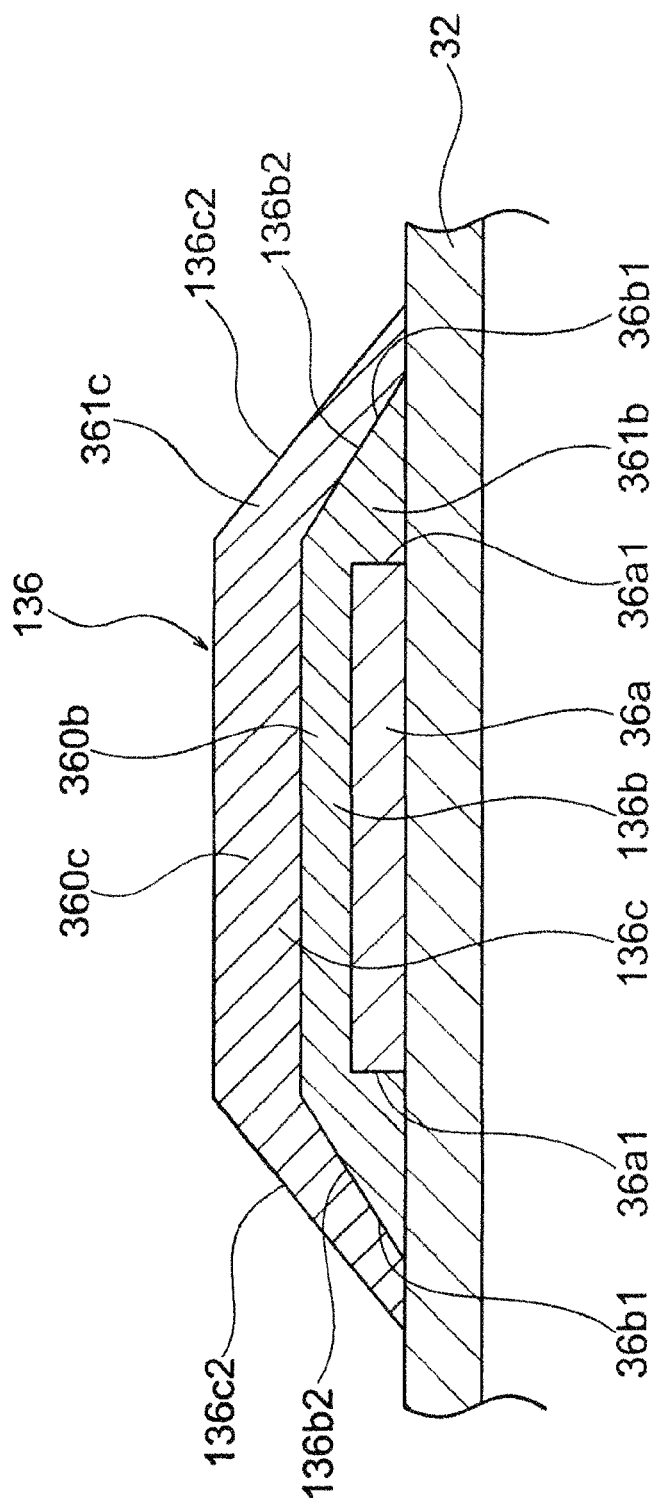
FIG. 5A is an enlarged cross-sectional view of a stacked electrode included in a pressure sensor according to Second Embodiment of the present invention.

Except for the following matters, a pressure sensor according to Second Embodiment of the present invention shown in FIG. 5A has a similar structure and demonstrates similar effects to the pressure sensor 10 according to First Embodiment. In the figure, common members with the pressure sensor 10 according to First Embodiment are denoted by common reference numerals and are not described.

The pressure sensor in the present embodiment includes a stacked electrode 136. The stacked electrode 136 includes a diffusion prevention layer 136b and a mounting layer 136c. The diffusion prevention layer 136b is different from the diffusion prevention layer 36b in First Embodiment in that first inclined portions 136b2 having a tapered surface are formed on the surface of a first peripheral portion 361b (the end surface 36b1 of the diffusion prevention layer 136b). The mounting layer 136c is different from the mounting layer 36c in First Embodiment in that second inclined portions 136c2 having a tapered surface are formed on the surface of the second peripheral portion 361c.

The first inclined portions 136b2 are formed at positions lateral (outside) the end surfaces 36a1 of the contact layer 36a so as to incline downward from the upper surface of the first peripheral portion 361b toward the upper surface of the strain resistance film 32. The second inclined portions 136c2 are formed at positions lateral (outside) the end surfaces 36a1 of the contact layer 36a so as to incline downward from the upper surface of the first peripheral portion 361c toward the upper surface of the strain resistance film 32. Note that, the first inclined portions 136b2 may be inclined downward from the upper surface of the first stacked portion 360b toward the upper surface of the strain resistance film 32 at positions inside the end surfaces 36a1 of the contact layer 36a. The same applies to the second inclined portions 136c2.

The inclination angle of the second inclined portions 136c2 with respect to the upper surface of the strain resistance film 32 is larger than the inclination angle of the first inclined portions 136b2 with respect to the upper surface of the strain resistance film 32, but these inclination angles may be equal to each other, or the inclination angle of the inclined portions 136c2 may be smaller than the inclination angle of the first inclined portions 136b2. Also, the surfaces of the first inclined portions 136b2 and the second inclined portions 136c2 may have a shape that bulges outward.

The surface shape of the diffusion prevention layer 136b is substantially trapezoidal when viewed in cross section. That is, in the present embodiment, the diffusion prevention layer 136b is formed so as to have a skirt at the peripheral portion 361b. Thus, unlike the peripheral portion 361b of the diffusion prevention layer 36b shown in FIG. 4A, the peripheral portion 361b of the diffusion prevention layer 136b is not connected at the right angle to the upper surface of the strain resistance film 32, but is connected smoothly at a predetermined angle to the upper surface of the strain resistance film 32.

Likewise, the surface shape of the mounting layer 136c is substantially trapezoidal when viewed in cross section. That is, in the present embodiment, the mounting layer 136c is formed so as to have a skirt at the peripheral portion 361c. Thus, unlike the peripheral portion 361c of the mounting layer 36c shown in FIG. 4A, the peripheral portion 361c of the mounting layer 136c is not connected at the right angle to the upper surface of the strain resistance film 32, but is connected smoothly at a predetermined angle to the upper surface of the strain resistance film 32.

The diffusion prevention layer 136b including the first inclined portions 136b2 can be formed by, for example, a lift-off method using a resist pattern having an inclined undercut as a mask. The mounting layer 136c including the second inclined portions 136c2 can be formed by the same method.

Also in the present embodiment, the same effects as in First Embodiment are obtained. Moreover, in the present embodiment, the mounting layer 136c overlying the diffusion prevention layer 136b and the diffusion prevention layer 136b overlying the contact layer 36a obliquely extends toward the upper surface of the strain resistance film 32 located outside the end surfaces 36a1 of the contact layer 36a. Thus, it is possible to form the mounting layer 136c and the diffusion prevention layer 136b to positions sufficiently separated from the end surfaces 36a1 of the contact layer 36a and to have sufficient distances between the end surfaces 36a1 of the contact layer 36 and the external environment. As a result, the end surfaces 36a1 of the contact layer 36a can be effectively isolated from the external environment, and the above-described effects can be obtained favorably.

Third Embodiment

Figure 6A:
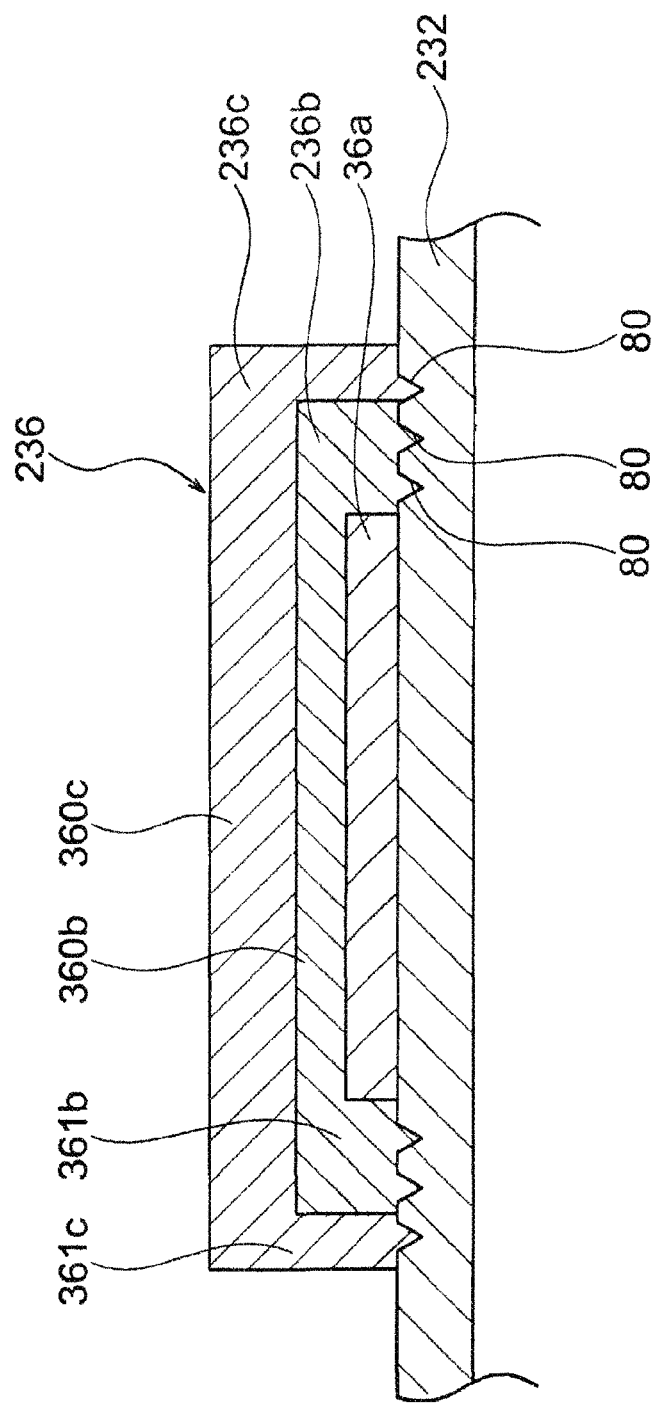
FIG. 6A is an enlarged cross-sectional view of a stacked electrode included in a pressure sensor according to Third Embodiment of the present invention.

Except for the following matters, a pressure sensor according to Third Embodiment of the present invention shown in FIG. 6A has a similar structure and demonstrates similar effects to the pressure sensor 10 according to First Embodiment. In the figure, common members with the pressure sensor 10 according to First Embodiment are denoted by common reference numerals and are not described.

The pressure sensor in the present embodiment includes a stacked electrode 236 and a strain resistance film 232. The stacked electrode 236 includes a diffusion prevention layer 236b and a mounting layer 236c. In the present embodiment, an unevenness 80 is formed on the interface (joint surface) between the diffusion prevention layer 236b and the strain resistance film 232. Likewise, an unevenness 80 is formed on the interface (joint surface) between the mounting layer 236c and the strain resistance film 232. That is, the diffusion prevention layer 236b and the mounting layer 236c are different from the diffusion prevention layer 36b and the mounting layer 36c in First Embodiment in that the unevenness 80 is formed on the bottom surface of each of the diffusion prevention layer 236b and the mounting layer 236c. Also, the strain resistance film 232 is different from the strain resistance film 32 in First Embodiment in that the unevenness 80 is formed on the upper surface of the strain resistance film 232.

The unevenness 80 is formed lateral the end surfaces 36a1 of the contact layer 36a in the in-plane direction. The unevenness 80 formed in the first peripheral portion 361b of the diffusion prevention layer 236b is continuous with the unevenness 80 formed in the second peripheral portion 361c of the mounting layer 236c, and the degree of the unevennesses 80 is approximately the same. Preferably, the unevenness 80 formed on the strain resistance film 232 has an arithmetic average roughness Ra of 1 to 30 nm.

The unevenness 80 can be formed by, for example, performing reverse sputtering on the portion of the strain resistance film 232 where the electrode is to be formed before forming the stacked electrode 236 on the strain resistance film 232. For more detail, reverse sputtering is performed on the portion of the surface of the strain resistance film 232 where the bottom surface of each of the diffusion prevention layer 236b and the mounting layer 236c is disposed. As a result, the portion of the surface of the strain resistance film 232 where the bottom surface of each of the diffusion prevention layer 236b and the mounting layer 236c is disposed becomes rougher than the portion where the bottom surface of the contact layer 36a is disposed. When the stacked electrode 236 is formed on the portion of the strain resistance film 232 where the electrode is to be formed with a rough surface, the lower surface of each of the diffusion prevention layer 236b and the mounting layer 236c bite into the unevenness 80 formed on the upper surface of the strain resistance film 232 in the formation of the stacked electrode 236 and can be provided with the unevenness 80.

Also in the present embodiment, the same effects as in First Embodiment are obtained. Moreover, in the present embodiment, the creepage distance along the interface between: the mounting layer 236c and the diffusion prevention layer 236b; and the strain resistance film 232 can be extended by the amount of the unevenness 80 formed on the interface between: the mounting layer 236c and the diffusion prevention layer 232b; and the strain resistance film 232, and it is possible to effectively isolate the end surfaces 36a1 of the contact layer 36a from the external environment and to favorably obtain the effects in First Embodiment. Moreover, in the present embodiment, the bonding area between: the mounting layer 232c and the diffusion prevention layer 232b; and the strain resistance film 232 is increased, and the adhesion force (bonding strength) therebetween can be increased.

Note that, the present invention is not limited to the above-described embodiments and may variously be modified within the scope of the present invention.

Figure 4B:
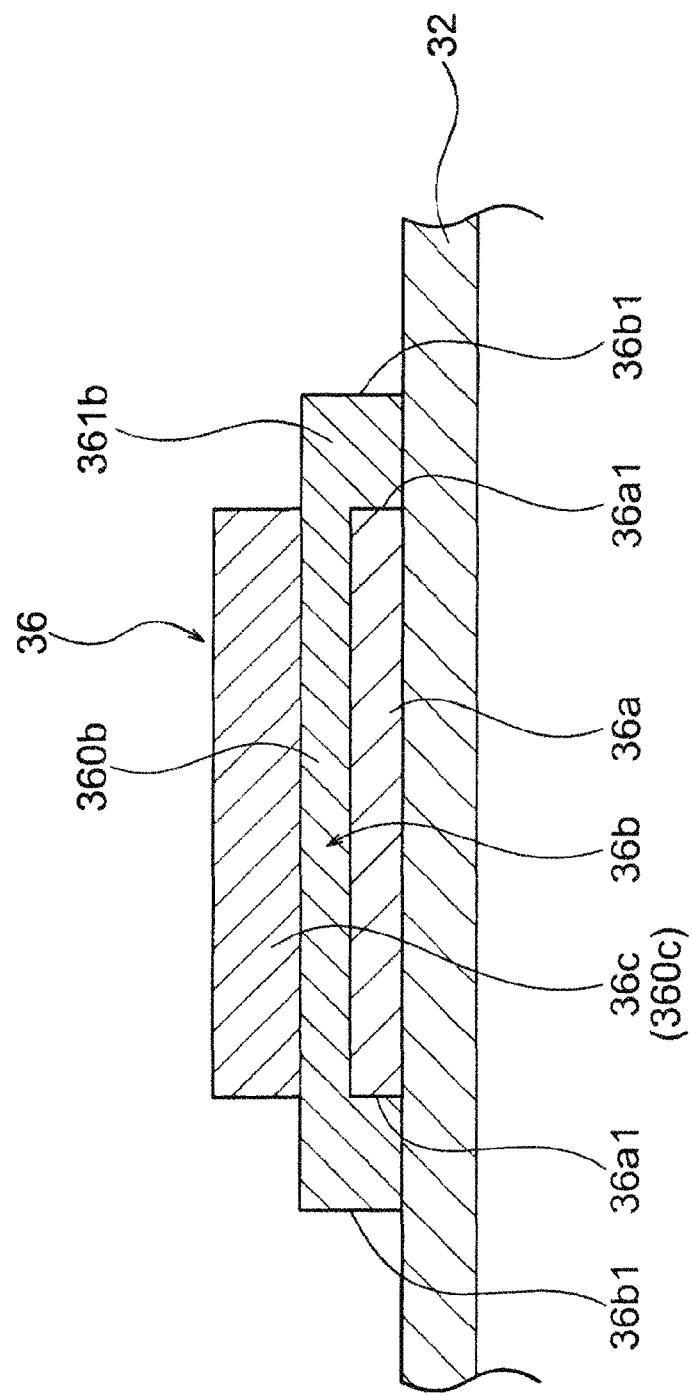
FIG. 4B is an enlarged cross-sectional view illustrating a modified example of the stacked electrode shown in FIG. 4A.

(1) In First Embodiment described above, as shown in FIG. 4A, the end surfaces 36a1 of the contact layer 36a are covered with two layers of the diffusion prevention layer 36b and the mounting layer 36c, but may be covered only with the diffusion prevention layer 36b as shown in FIG. 4B. In the illustrated example, the mounting layer 36c is made of only the second stacked portion 360c and is not provided with the second peripheral portion 361c. Thus, the end surfaces 36b1 of the diffusion prevention layer 36b are not covered with the mounting layer 36c and are exposed to the external environment.

The length of the mounting layer 36c along the in-plane direction is substantially equal to the length of the contact layer 36a along the in-plane direction. Except for thickness, the shape of the mounting layer 36c is substantially equal to the shape of the contact layer 36a. However, the length of the mounting layer 36c along the in-plane direction may be larger or smaller than the length of the contact layer 36a along the in-plane direction. The mounting layer 36c is not disposed on the upper surface of the first peripheral portion 361b of the diffusion prevention layer 36b, but is disposed only on the upper surface of the first stacked portion 360b of the diffusion prevention layer 36b. That is, the mounting layer 36c is disposed at a position (above) corresponding to the contact layer 36a in the perpendicular-plane direction. In the present modified example, similarly to First Embodiment described above, it is possible to prevent the end surfaces 36a1 of the contact layer 36a from being exposed to the external environment such as air.

Figure 4C:
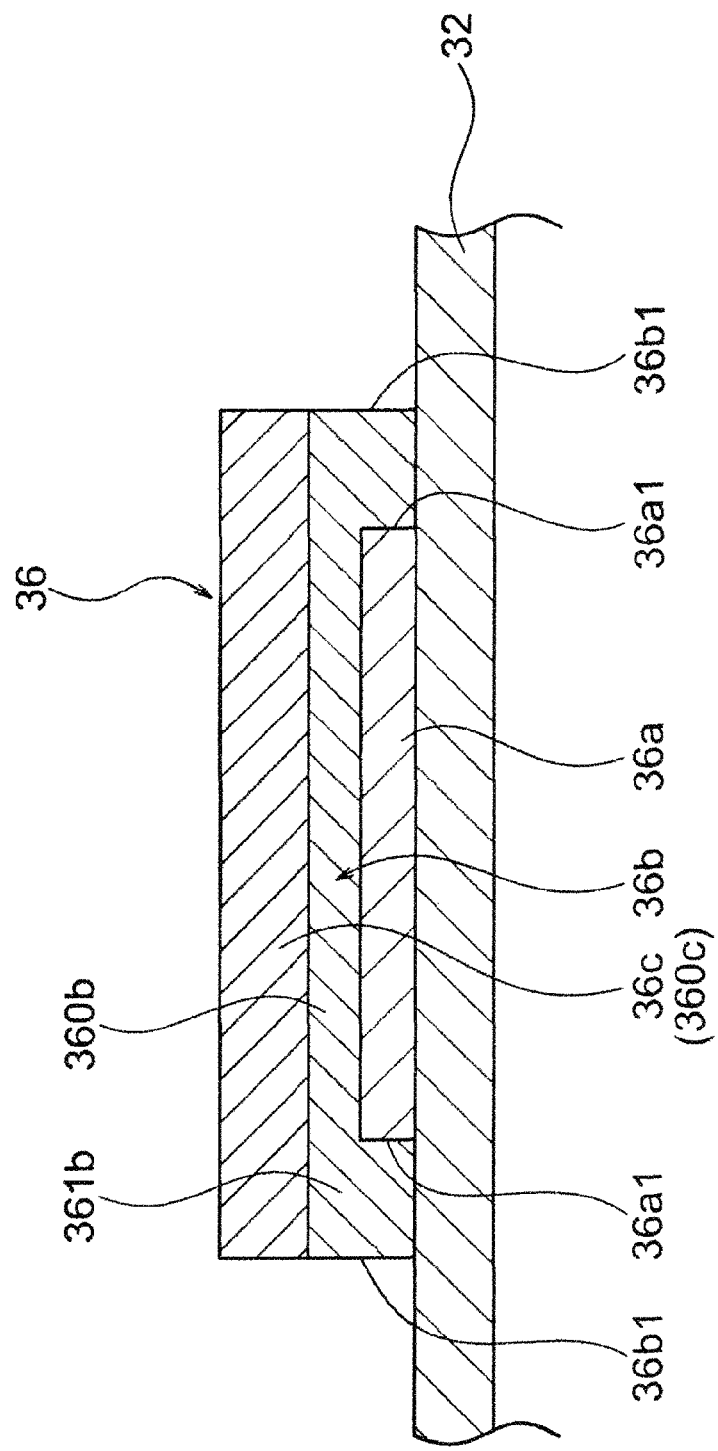
FIG. 4C is an enlarged cross-sectional view illustrating another modified example of the stacked electrode shown in FIG. 4A.

(2) In the above-described modified example (1), as shown in FIG. 4C, the length of the mounting layer 36c along the in-plane direction may be substantially equal to the length of the diffusion prevention layer 36b (the first stacked portion 360b and the first peripheral portion 361b) along the in-plane direction. In the illustrated example, the mounting layer 36c is formed so as to cover the entire upper surface of the diffusion prevention layer 36b. Even in such a configuration, the same effects as in the above-described modified example (1) are obtained. Moreover, compared to the mounting layer 36c in the above-described modified example (1), since the mounting layer 36c in the present modified example covers the upper surface of the diffusion prevention layer 36b over a wider range, it is possible to effectively prevent the elements contained in the contact layer 36a or the strain resistance film 32 from mutually diffusing from the upper surface of the contact layer 36a into the mounting layer 36c.

(3) In First Embodiment described above, as shown in FIG. 4D, the end surfaces 36a1 of the contact layer 36a may be covered only with the mounting layer 36c. In the illustrated example, the second peripheral portion 361c of the mounting layer 36c has approximately the same length in the in-plane direction as the first peripheral portion 361b of the diffusion prevention layer 36b shown in FIG. 4A. The thickness of the second peripheral portion 361c of the mounting layer 36c is approximately equal to the sum of the thickness of the contact layer 36a, the thickness of the diffusion prevention layer 36b, and the thickness of the second stacked portion 360c of the mounting layer 36c.

The second peripheral portion 361c is in contact with (closely contacted with) the end surfaces 36a1 of the contact layer 36 and the end surfaces 36b1 of the diffusion prevention layer 36b in the in-plane direction, and the end surfaces 36a1 of the contact layer 36 and the end surfaces 36b1 of the diffusion prevention layer 36b are covered in all directions with the inner side surfaces of the second peripheral portion 361c without being exposed to the external environment such as air. That is, in the present modified example, the mounting layer 36c among the diffusion prevention layer 36b and the mounting layer 36c covers the contact layer 36a so that the end surfaces 36a1 of the contact layer 36a are not exposed. Since the mounting layer 36c is made of a material (inert material) that is stable against high temperatures, such as Au, the illustrated configuration can effectively prevent deterioration of the contact layer 36a, particularly in a high temperature environment.

Also, the mounting layer 36c can be formed so as to have a comparatively large thickness. Thus, the end surfaces 36a1 of the contact layer 36a can be isolated from the external environment by the thick layer wall of the mounting layer 36c (second peripheral portion 361c), and the above-described effects can be obtained favorably.

Figure 5B:
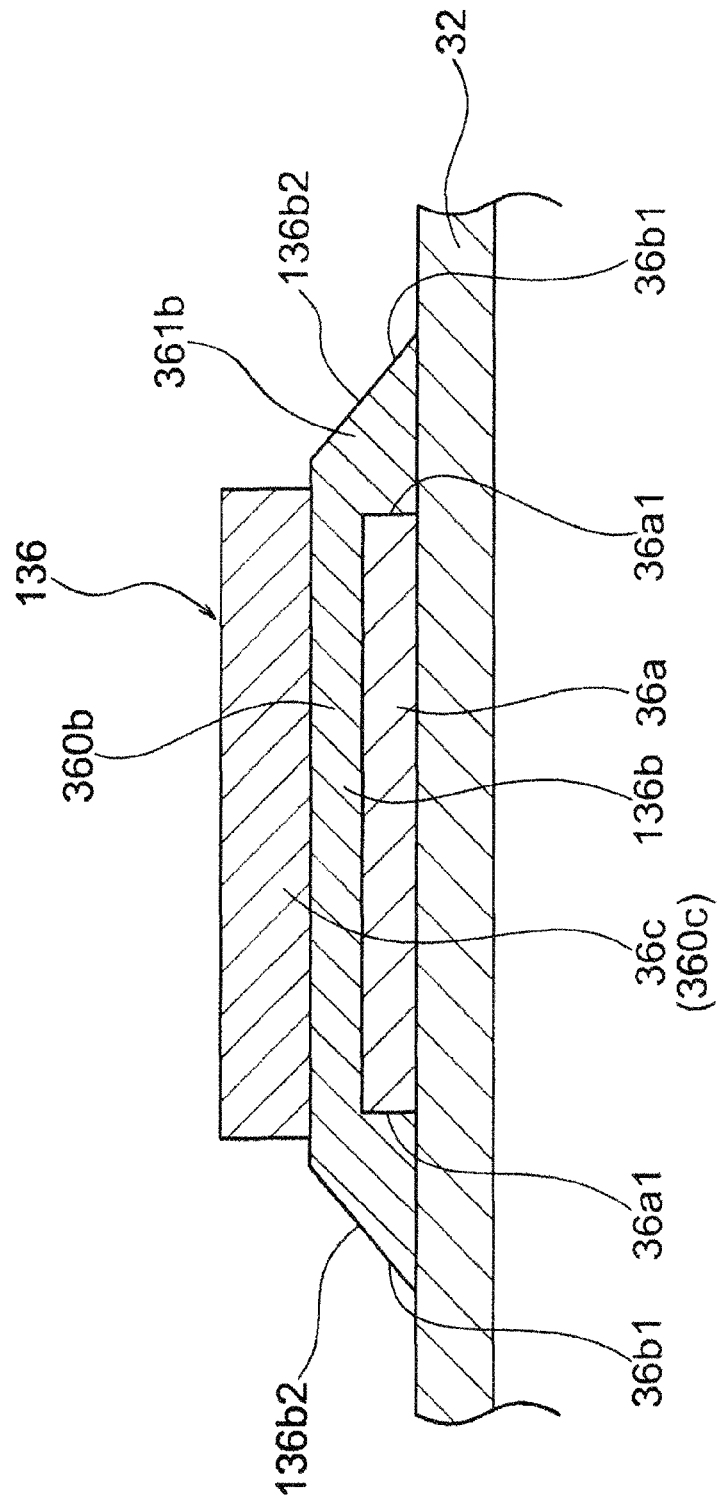
FIG. 5B is an enlarged cross-sectional view illustrating a modified example of the stacked electrode shown in FIG. 5A.

(4) In Second Embodiment described above, as shown in FIG. 5A, the end surfaces 36a1 of the contact layer 36a are covered with two layers of the diffusion prevention layer 136b and the mounting layer 136c, but may be covered only with the diffusion prevention layer 136b as shown in FIG. 5B. In the illustrated example, the mounting layer 36c is made of only the second stacked portion 360c and is not provided with the second peripheral portion 361c. Thus, the end surfaces 136b1 of the diffusion prevention layer 136b are not covered with the mounting layer 36c and are exposed to the external environment.

The length of the mounting layer 36c along the in-plane direction is larger than the length of the contact layer 36a along the in-plane direction, but may be equal to or smaller than the length of the contact layer 36a along the in-plane direction or may be substantially the same as the length of the diffusion prevention layer 136b along the in-plane direction. The mounting portion 36c is formed from the upper surfaces of the first stacked portion 360b to the first peripheral portion 361b of the diffusion prevention layer 36b. In the present modified example, similarly to Second Embodiment described above, it is possible to prevent the end surfaces 36a1 of the contact layer 36a from being exposed to the external environment such as air.

Figure 5C:
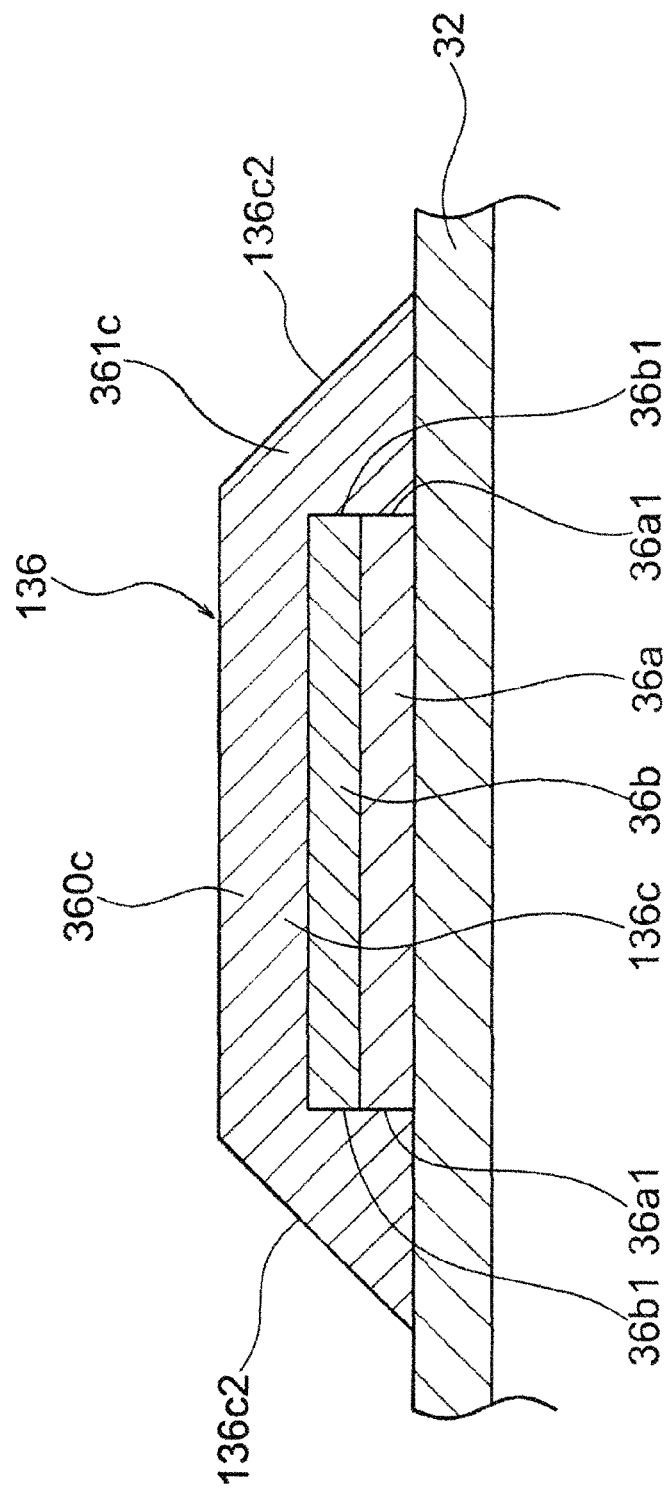
FIG. 5C is an enlarged cross-sectional view illustrating another modified example of the stacked electrode shown in FIG. 5A.

(5) In Second Embodiment described above, as shown in FIG. 5C, the end surfaces 36a1 of the contact layer 36a may be covered only with the mounting layer 136c. In the illustrated example, the diffusion prevention layer 36b is not provided with the first inclined portion 136b2 shown in FIG. 5A, and only the mounting layer 136c is provided with the second inclined portion 136c2. In the lateral of the end surfaces 36a1 of the contact layer 36a, the upper surface of the strain resistance film 32 is not in contact with the diffusion prevention layer 36b, but is in contact only with the mounting layer 136c (second peripheral portion 361c). The maximum thickness of the second peripheral portion 361c of the mounting portion 136c is substantially equal to the sum of the thickness of the contact layer 36a, the thickness of the diffusion prevention layer 36b, and the thickness of the second stacked portion 360c of the mounting portion 136c.

The second peripheral portion 361c is in contact with (closely contacted with) the end surfaces 36a1 of the contact layer 36 and the end surfaces 36b1 of the diffusion prevention layer 36b in the in-plane direction, and the end surfaces 36a1 of the contact layer 36 and the end surfaces 36b1 of the diffusion prevention layer 36b are covered in all directions with the inner side surfaces of the second peripheral portion 361c without being exposed to the external environment such as air. That is, in the present modified example, the mounting layer 136c among the diffusion prevention layer 36b and the mounting layer 136c covers the contact layer 36a so that the end surfaces 36a1 of the contact layer 36a are not exposed. Thus, also in the present modified example, the same effects as in the modified example (3) are obtained.

(6) In Second Embodiment described above, as shown in FIG. 5D, stepped portions 136b3 may be provided on the first peripheral portion 361b of the diffusion prevention layer 136b, and stepped portions 136c3 may be provided on the second peripheral portion 361c of the mounting layer 136c. In the step portion 136b3, only one stair-like step is provided on the surface (outer surface) of the first peripheral portion 361b. In the step portion 136c3, only one stair-like step is provided on the surface (outer surface) of the second peripheral portion 361c. However, a plurality of steps may be provided on the surface of each of the first peripheral portion 361b and the second peripheral portion 361c.

In the illustrated example, the step height of the first step portions 136b3 is smaller than the thickness of the first stacked portion 360b of the diffusion prevention layer 136b. Also, the first step portions 136b3 are formed at the positions of the end surfaces 36a1 of the contact layer 36a. Note that, the positions of the first step portions 136b3 may be shifted inside the end surfaces 36a1 of the contact layer 36a or may be shifted outside the end surfaces 36a1 of the contact layer 36a.

The positions of the second stepped portions 136c3 are shifted outside the end surfaces 36b1 of the diffusion prevention layer 136b. Note that, the second stepped portions 136c3 may be formed at the same positions as the end surfaces 36b1 of the diffusion prevention layer 136b or may be shifted inside the end surfaces 136b1 of the diffusion prevention layer 136b.

The diffusion prevention layer 136b including the stepped portions 136b3 can be formed by, for example, a lift-off method using a resist pattern having a stepped undercut as a mask. The mounting layer 136c including the step portions 136c3 can also be formed by the same method. Also in the present modified example, the same effects as in Second Embodiment described above are obtained. Note that, the first peripheral portion 361b of the diffusion prevention layer 136b shown in FIG. 5B may be provided with the first stepped portions 136b3, or the second peripheral portion 361c of the mounting layer 136c shown in FIG. 5C may be provided with the second stepped portions 136c3.

Figure 6B:
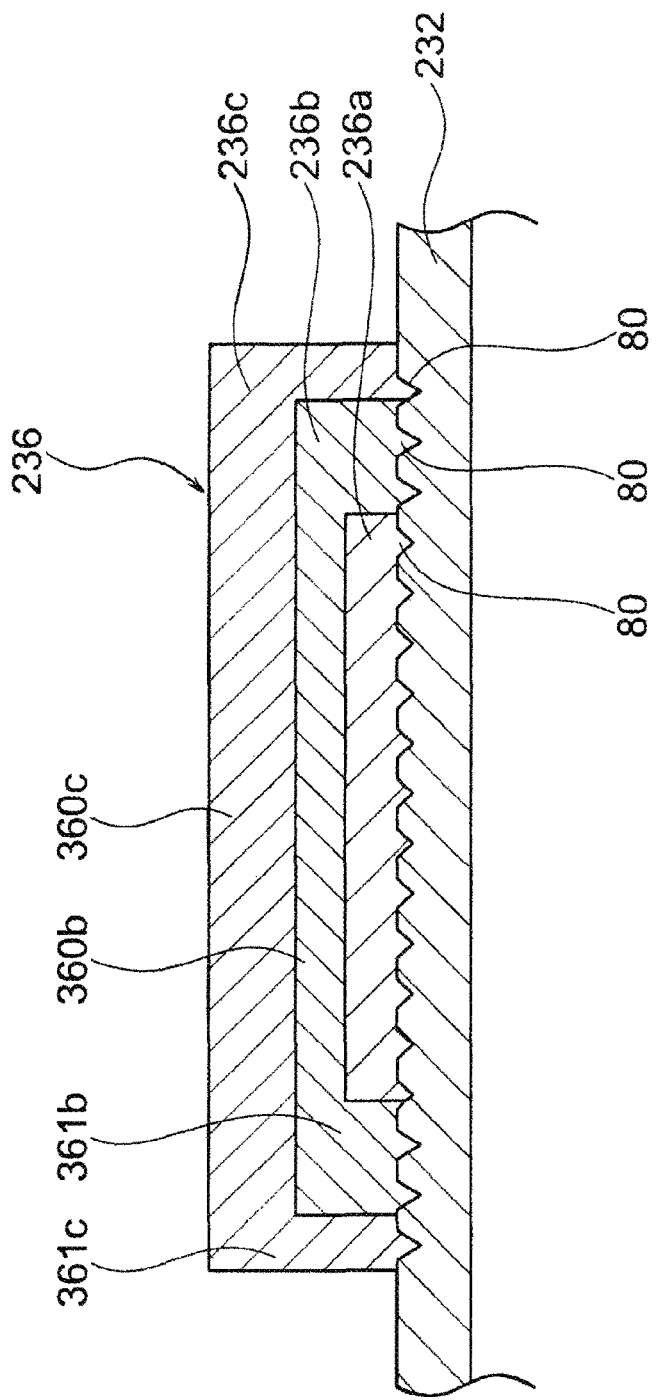
FIG. 6B is an enlarged cross-sectional view illustrating a modified example of the stacked electrode shown in FIG. 6A.

(7) In Third Embodiment described above, as shown in FIG. 6B, the bottom surface of the contact layer 236a may be provided with the unevenness 80. In the contact layer 236a shown in FIG. 6B, the unevenness 80 is formed on the entire bottom surface. The unevenness 80 is continuously formed from the bottom surface of the contact layer 236a to the bottom surface of the diffusion prevention layer 236b. In the illustrated example, the unevenness 80 formed on the bottom surface of the contact layer 236a is smaller than the unevenness 80 formed on the bottom surface of each of the first peripheral portion 361b of the diffusion prevention layer 236b and the second peripheral portion 361c of the mounting layer 236c, but may be equal to or larger than the unevenness 80 formed on the bottom surface of each of the first peripheral portion 361b of the diffusion prevention layer 236b and the second peripheral portion 361c of the mounting layer 236c. In the present modified example, the unevenness 80 can be formed over a wide range on the bottom surface of the stacked electrode 236, and the same effects as in Third Embodiment can be obtained favorably.

Note that, the unevenness 80 may be formed only on the bottom surface of the contact layer 236a, only on the bottom surface of the first peripheral portion 361b of the diffusion prevention layer 236b, or only on the bottom surface of the second peripheral portion 361c of the mounting layer 236c. Also, the unevenness 80 may be formed only on the bottom surface of each of the contact layer 236a and the first peripheral portion 361b of the diffusion prevention layer 236b or only on the bottom surface of each of the contact layer 236a and the second peripheral portions 361c of and the mounting layer 236c.

(8) In each of Embodiments described above, for example, the pressure sensor 10 is not limited to one including the stem 20 as shown in FIG. 1 and may be one including the electrode-equipped strain resistance film 30 on a plate-shaped substrate. The material of the substrate is, for example, Si, alumina ($Al_2O_3$), etc.

Figure 4D:
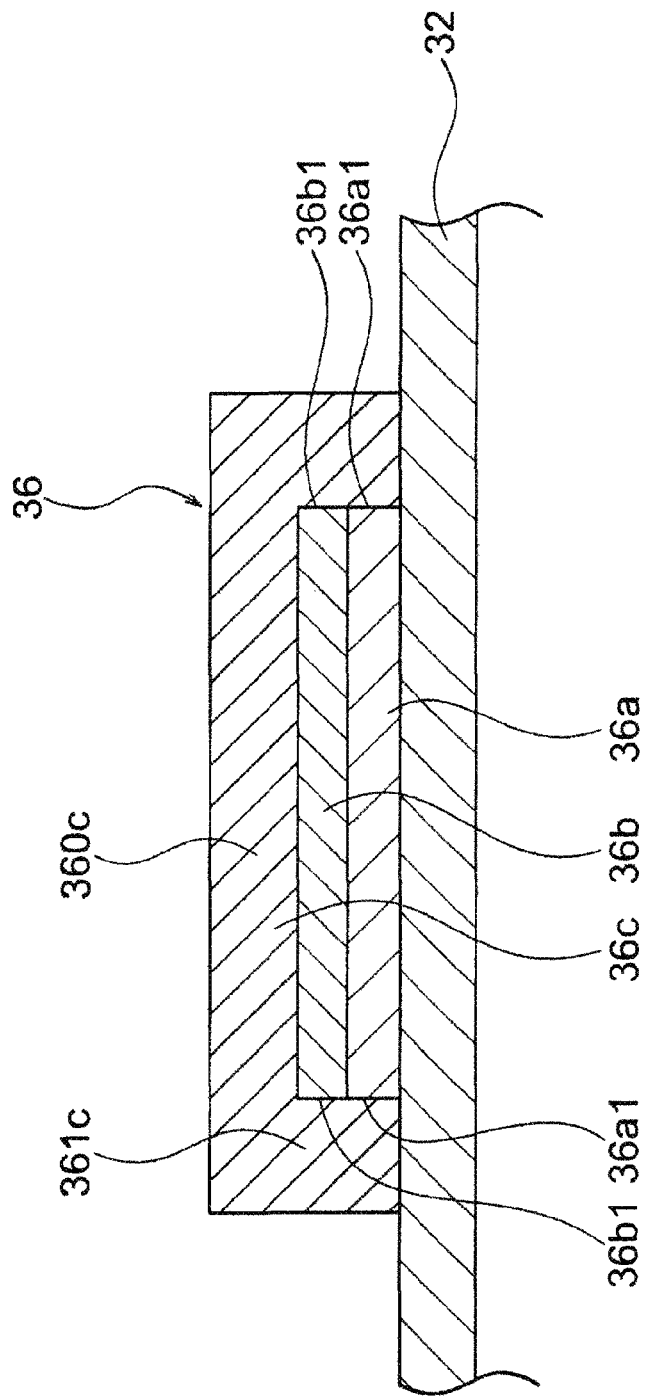
FIG. 4D is an enlarged cross-sectional view illustrating another modified example of the stacked electrode shown in FIG. 4A.
Figure 5D:
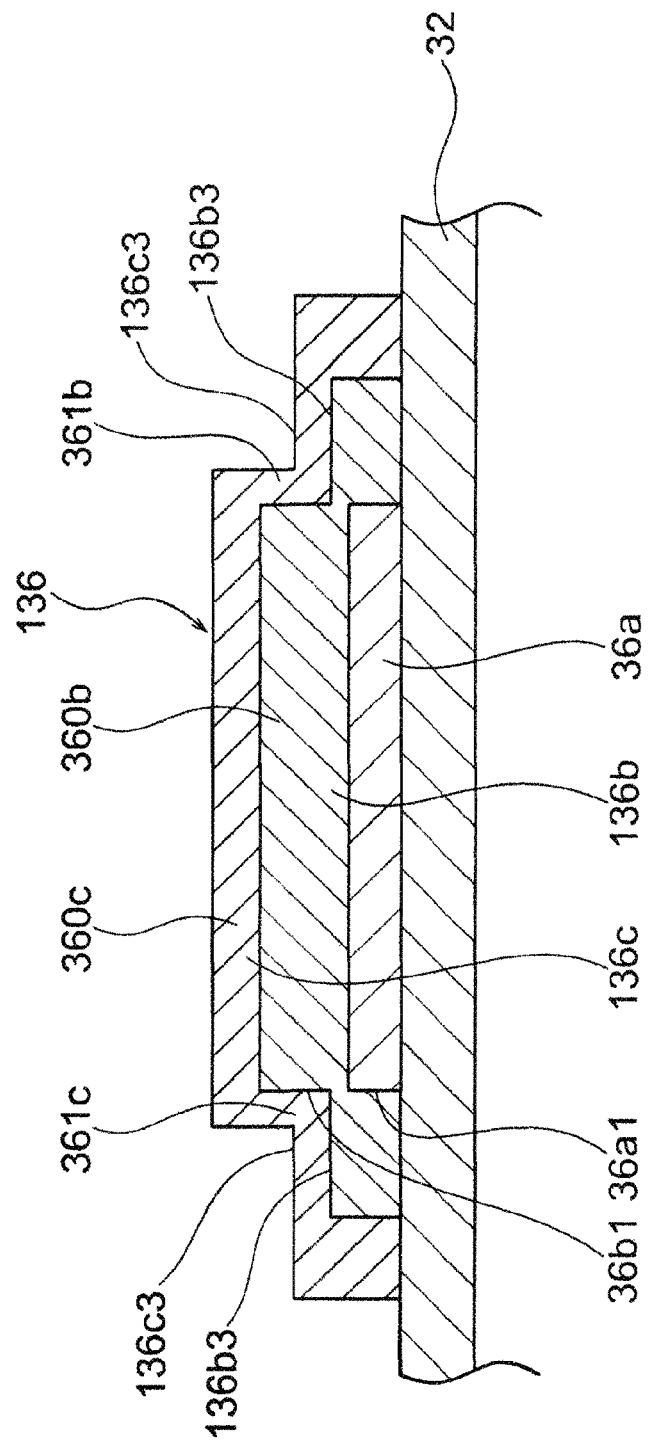
FIG. 5D is an enlarged cross-sectional view illustrating another modified example of the stacked electrode shown in FIG. 5A.

(9) The diffusion prevention layer 36b or the mounting layer 36c shown in FIG. 4B to FIG. 4D may be provided with the stepped portions 136b3 or the stepped portions 136c3 shown in FIG. 5D. Also, the interface between the stacked electrode 36 and the strain resistance film 32 shown in FIG. 4B to FIG. 4D may be provided with the unevenness 80 shown in FIG. 6A and FIG. 6B. Also, the interface between the stacked electrode 136 and the strain resistance film 32 shown in FIG. 5A to FIG. 5D may be provided with the unevenness 80 shown in FIG. 6A and FIG. 6B.

EXPLANATION OF REFERENCES

- 10 . . . pressure sensor
- 12 . . . connection member
- 12a . . . screw groove
- 12b . . . flow path
- 14 . . . holding member
- 16 . . . circuit board
- 20 . . . stem
- 21 . . . flange portion
- 22 . . . membrane
- 22a . . . inner surface
- 22b . . . outer surface
- 30 . . . electrode-equipped strain resistance film
- 32, 232 . . . strain resistance film
- R1 . . . first resistor
- R2 . . . second resistor
- R3 . . . third resistor
- R4 . . . fourth resistor
- 34 . . . electric wiring
- 36, 136, 236 . . . strain-resistance-film stacked electrode (stacked electrode)
- 36a, 236a . . . contact layer
- 36b, 136b, 236b . . . diffusion prevention layer
- 360b . . . first stacked portion
- 361b . . . first peripheral portion
- 36c, 136c, 236c . . . mounting layer
- 360c . . . second stacked portion
- 361c . . . second peripheral portion
- 136b2, 136c2 . . . inclined portion
- 136b3, 136c3 . . . stepped portion
- 52 . . . base insulating layer
- 72 . . . intermediate wiring
- 80 . . . unevenness

The invention claimed is:

1. A stacked electrode provided on a strain resistance film containing Cr and Al, comprising:
   a contact layer overlying the strain resistance film;
   a diffusion prevention layer overlying the contact layer; and
   a mounting layer overlying the diffusion prevention layer, wherein the diffusion prevention layer or the mounting layer covers the contact layer so that the contact layer is not exposed.

2. The stacked electrode according to claim 1, wherein the mounting layer or the diffusion prevention layer is in contact with an upper surface of the strain resistance film at a position outside an end surface of the contact layer.

3. The stacked electrode according to claim 1, wherein the mounting layer among the diffusion prevention layer and the mounting layer covers the contact layer so that an end surface of the contact layer is not exposed.

4. The stacked electrode according to claim 1, wherein
   the diffusion prevention layer covers the contact layer so that an end surface of the contact layer is not exposed, and
   the mounting layer covers the diffusion prevention layer so that an end surface of the diffusion prevention layer is not exposed.

5. The stacked electrode according to claim 1, wherein the mounting layer overlying the diffusion prevention layer or the diffusion prevention layer overlying the contact layer obliquely extends toward an upper surface of the strain resistance film located outside an end surface of the contact layer.

6. The stacked electrode according to claim 1, wherein an unevenness is formed on an interface between the mounting layer or the diffusion prevention layer and the strain resistance film.

7. The stacked electrode according to claim 1, wherein
   the contact layer contains Ti,
   the diffusion prevention layer contains a platinum group element, and
   the mounting layer contains Au.

8. An electrode-equipped strain resistance film comprising:
   the stacked electrode according to claim 1; and
   the strain resistance film provided with the stacked electrode.

9. A pressure sensor comprising:
   the stacked electrode according to claim 1;
   the strain resistance film provided with the stacked electrode; and
   a membrane provided with the strain resistance film.

* * * * *